United States Patent

[11] 3,607,080

[72] Inventors T. O. Paine
Administrator of the National Aeronautics and Space Administration with respect to an invention of;
Ellsworth R. Blosser; Robert B. Iden, Columbus; Elton H. Hall, Worthington, all of Ohio
[21] Appl. No. 848,805
[22] Filed Aug. 11, 1969
[45] Patented Sept. 21, 1971

[54] METHOD FOR DETERMINING PRESENCE OF OH IN MAGNESIUM OXIDE
7 Claims, 1 Drawing Fig.
[52] U.S. Cl. ................................................ 23/230,
23/201, 23/253, 73/76
[51] Int. Cl. ...................................................... C01f 5/06,
G01n 25/56, G01n 33/00
[50] Field of Search ........................................... 23/230, 230
PC; 73/73, 76

[56] References Cited
UNITED STATES PATENTS
| | | | |
|---|---|---|---|
| 2,606,816 | 8/1952 | Zettlemoyer et al. ......... | 23/201 |
| 3,236,595 | 2/1966 | Carnall, Jr. et al. ........... | 23/201 |
| 3,451,773 | 6/1969 | Muller ........................ | 23/201 |

OTHER REFERENCES

Schmidt et al., Chemical Abstracts, Vol. 28, 5600- 1 (July-Sept., 1934).

*Primary Examiner*—Joseph Scovronek
*Attorneys*—J. H. Warden, Monte F. Mott and G. T. McCoy

ABSTRACT: A method for determining the amount and type of OH present in MgO, comprising heating the MgO in a series of steps of successively higher temperatures, with a final step utilizing an oxygen atmosphere and a temperature above the decomposition temperature of the compound $Mg(OH)_2$ and measuring the amount of water vapor evolved in each step.

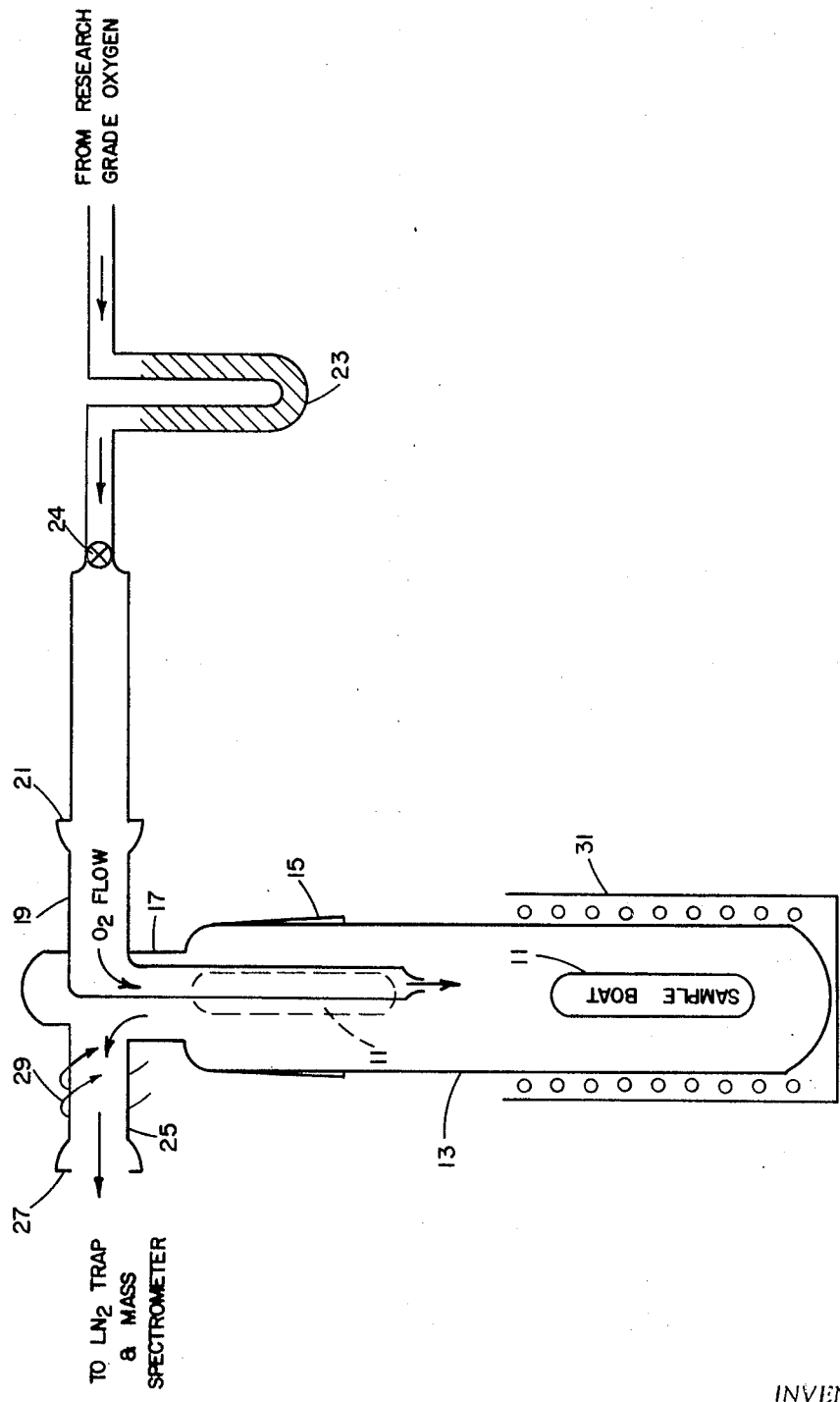

METHOD FOR DETERMINING PRESENCE OF OH IN MAGNESIUM OXIDE

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

This invention is in the field of chemical analysis of impurities present in material. More particularly, the invention relates to a method for determining the presence of OH in MgO.

2. Description of the Prior Art

The presence of impurities in MgO can affect its mechanical, electrical, chemical and optical properties. Since this material is one of the most prevalent and useful high temperature refractories, it is very important to detect the degree of purity and the types of impurities present which can so deleteriously affect performance.

Most of the impurities present in MgO can be readily determined by standard instrumental and chemical means. The one main impurity not readily determinable by previous normal approaches was OH. It has been found that even attempts to liberate OH by utilizing induction heating to raise the temperature of MgO to as high as 3,300° C. failed to give reproducible data. Such high temperatures were utilized together with mixing the MgO with carbon in an attempt to rupture all the MgO bonds and form CO and Mg, thus liberating OH. Additionally, other thermal methods including vacuum fusion and the like also fail to determine the OH, since it is believed that the OH is too tightly bound to be released by heating. Mass spectographic techniques are subject to inaccuracies especially at high OH levels. Infrared measurement is feasible only for transparent MgO. Further, utilizing IR techniques, one is not able to differentiate between the surface and bulk OH present.

OBJECTS AND SUMMARY OF THE INVENTION

An object of the invention is to provide a method for determining all of the OH present in MgO.

Another object of the invention is to provide a method for determining the types of OH present in MgO.

A further object of the invention is to provide a method for making MgO free of OH impurity.

The above and other objects of the invention are accomplished by the herein method wherein a sample of MgO is first heated at a low temperature in a vacuum on the order of 100° C. to drive off OH which is present in the form of surface water. The sample is then heated at a much higher temperature, on the order of 500° C. in a vacuum for a period of time until no further OH is released in the form of water vapor. The OH released during this step is believed to be that in the form of $Mg(OH)_2$. Finally, the sample is heated at a temperature on the order of 500° C. in the presence of oxygen. The OH released during this step is believed to be tightly bound in the form of MgOH. During each step, the $H_2O$ gas liberated is measured and analyzed. This procedure provides an accurate means for determining the amount of all the OH present in MgO in addition to indicating the type of OH that was in the sample tested. Further, as can be appreciated, the method inherently serves to provide a resultant MgO that is free of the OH impurity.

BRIEF DESCRIPTION OF THE DRAWING

The drawing is a schematic representation of the apparatus used to perform the method of the invention.

DESCRIPTION OF THE PREFERRED EMBODIMENT

It has been previously proposed that in MgO there exists three types of OH. The first type is surface $H_2O$ bound by the MgO. The second type is chemically bound OH within the particles. The second type can be considered as brucite $[Mg(OH)_2]$ "water." The final and third form of OH is more tightly bound than the previous two forms. It is a substitute for an O atom in the lattice and is present not as $Mg(OH)_2$ but as MgOH.

Brucite, $Mg(OH)_2$, will decompose quantitatively at temperatures below 400° C. In view of this, initial effort was directed to subjecting MgO when mixed with carbon to higher and higher temperatures in an attempt to rupture all the MgO bonds to form CO and Mg thus liberating OH. Using temperatures up to as high as 3,300° C. failed to give reproducible data.

The herein invention presents an entirely different approach for determining the presence of OH in MgO. Particularly, as indicated above, the last or third form of OH present in a tightly bound form requires a different and unusual approach to liberate the OH. Thus, the herein invention is first predicated upon the following reaction wherein the MgOH is converted to $Mg(OH)_2$, thus converting the more tightly bound form of OH to one that is more readily liberated at reasonable temperatures.

1. $2\ MgOH + 1/2\ O_2 \rightarrow Mg(OH)_2 = MgO$ The aforegoing reaction 1 is favored by heat and obviously by a large partial pressure of $O_2$. Thus, once $Mg(OH)_2$ is formed, it then becomes possible to break it down in accordance with the following reaction 2 which has been shown to proceed at temperatures even below 400° C.

2. $Mg(OH)_2 \rightarrow MgO = H_2O$

Thus, in accord with the herein invention, a sample of MgO to be analyzed is first heated, for example, at 100° C in a vacuum for a period of generally at least 30 minutes. During this step, surface water vapor is driven from the MgO. The evolved gas is trapped in a liquid nitrogen trap. The trap is then isolated and warmed. The gas is expanded into a known volume, measured, and analyzed mass spectrometrically. The step can be repeated as often as necessary in order to obtain a plateau wherein no additional $H_2O$ is released upon further heating, or may be continued until such a plateau is reached. Next, the sample is subjected to a temperature on the order of 500° C. in a vacuum and the gases evolved are collected and analyzed in the manner previously described. At 500° C. the water released is of the type considered to be $Mg(OH)_2$.

The final and important step of this invention involves heating the sample at about 500° C. in an oxygen atmosphere to form $Mg(OH)_2$ in accord with reaction 1. Then as indicated in Reaction 2, the $Mg(OH)_2$ will break down at a temperature of about 500° C. to liberate $H_2O$. The pressure of $O_2$ can vary from 1 to about 130 torr. This step thus serves to release the OH tightly bound to the Mg which is not otherwise releasable at even severely high temperatures. As can be seen, the conditions to achieve this in accord with the herein invention are quite mild and the results are reproducible.

In order to confirm the predicted operability of the foregoing steps of the invention and to obviate the possibility of each heating step merely serving to remove surface water more nearly quantitatively, a series of experiments was run. Firstly, samples of MgO which were repeatedly heated at 500° C. without $O_2$ released very small amounts of additional $H_2O$. However, when $O_2$ was then added more $H_2O$ was released. Secondly, a sieved sample gave essentially the same results as an unsieved sample. Thirdly, and most importantly, was the behavior of a sieved sample that was exposed to moist air after having been heated in the various steps as described. The sample was exposed to moist air at a partial pressure of $H_2O$ of about 15 torr. After 18 hours exposure, the MgO should have picked up a large amount of surface water. The first heating step of 100° C. in vacuum released about the same amount of $H_2O$ that had been found in a corresponding step earlier for that sample. However, subsequent heating steps of 500° C. in vacuum and 500° C. in $O_2$ released only small fractions of the amounts of $H_2O$ that had been found when these steps had It should be pointed out that the temperatures utilized at the various steps of the invention are not necessarily critical. The first temperature which was indicated as being about 100° C. should be a temperature that is sufficient to drive off surface water. Thus, this temperature could range from 100° C. to 250° C. The second temperature level must be sufficient to decompose brucite, which is $Mg(OH)_2$. The decomposition of brucite ranges from 300° C. to 450° C. As a result, a temperature of about 500° C. was indicated to completely assure such decomposition. However, this temperature could obviously range from about 500° C. upward. If desired, in order to actually speed up the reactions involved, the initial or first temperature level could be about 250° C. and the second temperature plateau could be 800° C.

Turning now to the FIGURE, there is seen a schematic diagram of the apparatus used to perform the method of the invention. A sample boat 11 is shown disposed within a Vycor reaction vessel 13. The reaction vessel 13 is attached to a Pyrex fitting 15, which in turn is a part of a Pyrex inlet 17. Entering the vessel 13 is inlet line 19 through which oxygen from a source not shown can be directed into the reaction vessel. The inlet line 19, which can be of Pyrex or suitable material, has a pivot 21 therein so as to allow rotation of the vessel 13. The oxygen, when utilized, passes through a molecular sieve 23 with a valve 24 controlling the admission or flow to the reaction vessel. The inlet portion 17 of the device is further provided with an exit line 25 through which gases leaving the sample can escape to a liquid nitrogen trap and then to a mass spectrometer, both not shown. The exit line 25 is likewise provided with a pivot 27 therein so as to allow, as indicated, the reaction vessel 13 to rotate about the axis formed by the inlet line 19 and exit line 25 in accord with the arrows 29.

The sample boat 11 in its initial position during the degassing phase of the method, is located toward the inlet portion 17. By mere rotation of the vessel 13 the boat is then forced by gravity and gentle tapping to a position as shown toward the bottom of the device, where it is heated at the various desired temperature levels by a resistive heater 31.

It is believed the invention will be further understood from the following detailed examples

EXAMPLE I

A sample of MgO weighing about 10 mg., was placed in a Vycor boat inside a Vycor reaction vessel as shown in the drawing. The reaction vessel was then heated by heater 31 at 100° C. for 20 minutes to degas the reaction vessel. The Vycor reaction vessel was then rotated to allow the sample boat to slide into the heating zone. The sample was held at 100° C. for 20 minutes under a vacuum. The $H_2O$ released was collected and measured. The $H_2O$ is determined by measuring the pressure of the total effluent released while contained in a known volume. A portion of this effluent is then analyzed using a mass spectrometer to determine the percent $H_2O$ in the effluent. The mass spectrometer response to water is calibrated using distilled water as a standard. The OH found was expressed as the weight percent of $Mg(OH)_2$ and was 0.4 weight percent. The vessel was then rotated so that the sample returned to its initial position. The vessel was then degassed at 500° C. for 30 minutes. Next, the vessel was rotated so that the sample was then heated at 500° C. in the vacuum, and again the released $H_2O$ was measured. The OH expressed as the weight percent of $Mg(OH)_2$ was 11.1 percent. Finally, the sample was maintained at 500° C. with 20 torr of $O_2$ flowing through the vessel. The amount of OH expressed as the weight percent of $Mg(OH)_2$ was 4.0 percent. Thus, the total OH found was 15.5 weight percent expressed as $Mg(OH)_2$. It should be pointed out that though a two step degassing was used, an initial heating of the vessel to 500° C. for 30 minutes is found to provide adequate results.

EXAMPLE II

Example I was essentially repeated, except that at least two heating periods were employed at each step to determine if the increases were real or were merely evidence of insufficient time in the previous Example I. Three runs of 20 minutes each were made at 100° C. At the end of the first 20 minute period, 1.1 weight percent of OH was released. At the end of both the second and third 20 minute periods, at which the sample was held at 100° C., 0.10 weight percent of OH was found, or a total in the second sample of 1.3 weight percent after the three runs at 100° C. Next, were two runs at 500° C., at the vacuum conditions. The first run of 30 minutes released 20.3 weight percent OH. The second run did not release any further OH. Finally, two runs were made at 500° C. of 30 minutes each in an oxygen atmosphere of 20 torr. The first run released 5.3 weight percent OH, while the second run released no OH. Thus the total of OH present in this second sample was 26.9 weight percent, expressed as a weight percent expressed as $Mg(OH)_2$.

It should be apparent from the aforegoing description and examples that neither the apparatus nor the readout equipment such as a mass spectrometer are unique. Any design or arrangement that allows a sample to be heated in a low-pressure oxygen atmosphere would serve satisfactorily. The particular design utilized in a pivotable reaction vessel readily allowed a preliminary degassing. However, other designs, such as the utilization of magnetic pushers, for example, could accomplish the same end result.

As can now be appreciated, the above-described method inherently produces an essentially OH free MgO product. This thus becomes a valuable technique for reasons other than analysis of the material.

What is claimed is:

1. A method for determining the type and amount of OH in an MgO sample comprising:
    heating the MgO sample in a vacuum to a first temperature sufficient to drive off surface water,
    heating said sample in a vacuum at a higher second temperature above the decomposition temperature of $Mg(OH)_2$ sufficient to release additional water,
    heating said sample in an oxygen atmosphere at a third temperature sufficient to drive off further water from the sample,
    and collecting and measuring the amount of water driven from the sample at each of the temperature levels.
2. The method of claim 1 wherein:
    the second and third temperature levels to which the sample is heated are approximately equivalent.
3. The method of claim 1 wherein:
    said first temperature is from 100° C. to 250° C.
4. The method of claim 3 comprising:
    maintaining the sample at said first temperature level for a period of time until no further water is released.
5. The method of claim 2 wherein:
    said second and third temperature levels are from 500° C. to 800° C.
6. The method of claim 5 comprising:
    maintaining the sample at each of the second and third levels until no further water is released at that condition.
7. The method of claim 1 comprising:
    maintaining the $O_2$ pressure between one and 130 torr during the heating of said sample to the third temperature.